United States Patent
Hayashi

(10) Patent No.: US 6,616,577 B2
(45) Date of Patent: Sep. 9, 2003

(54) CLUTCH CONTROL APPARATUS

(75) Inventor: Masahiko Hayashi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/883,735

(22) Filed: Jun. 19, 2001

(65) Prior Publication Data

US 2002/0002101 A1 Jan. 3, 2002

(30) Foreign Application Priority Data

Jun. 30, 2000 (JP) .......................... 2000-203136

(51) Int. Cl.$^7$ .............................................. B60K 4/02
(52) U.S. Cl. ..................... 477/168; 477/174; 477/180
(58) Field of Search ................................ 477/168, 174, 477/180, 181, 80, 86, 91; 192/3.54, 3.57

(56) References Cited

U.S. PATENT DOCUMENTS

| | | | | |
|---|---|---|---|---|
| 4,618,043 A | * | 10/1986 | Hattori et al. | 477/85 |
| 4,671,397 A | * | 6/1987 | Asagi et al. | 477/86 |
| 5,206,805 A | * | 4/1993 | Petzold et al. | 192/32 |
| 5,413,542 A | | 5/1995 | Jarvis | 477/84 |
| 5,595,550 A | * | 1/1997 | Jarvis et al. | 477/84 |
| 5,957,805 A | | 9/1999 | Salecker et al. | 477/74 |
| 6,094,976 A | * | 8/2000 | Hayashi et al. | 73/118.1 |
| 6,189,665 B1 | * | 2/2001 | Yamamoto et al. | 192/111 R |

FOREIGN PATENT DOCUMENTS

| | | | | |
|---|---|---|---|---|
| DE | 2707791 | * | 9/1977 | F16D/43/06 |
| DE | 19856587 | | 6/1999 | B60K/41/02 |
| EP | 0 243 196 | | 10/1987 | B60K/41/02 |
| EP | 0 423 799 | | 4/1991 | B60K/41/08 |
| GB | 2 318 848 | | 6/1998 | B60K/41/22 |
| JP | 60-35633 | | 2/1985 | B60K/41/02 |
| JP | 11-245679 | | 9/1999 | B60K/20/02 |
| JP | 11-247885 | | 9/1999 | F16D/25/08 |
| JP | 02001260711 | * | 9/2001 | B60K/41/02 |
| JP | 02001330138 | * | 11/2001 | F16H/61/14 |

OTHER PUBLICATIONS

Copy of EPC Search Report for Serial No. EP 01 11 5528 dated Jul. 25, 2002.

* cited by examiner

Primary Examiner—Charles A. Marmor
Assistant Examiner—Tisha D. Lewis
(74) Attorney, Agent, or Firm—McCormick, Paulding & Huber LLP

(57) ABSTRACT

Clutch disengagement shock resulting from the sudden release of torsional torque is prevented and ride-feeling at the time of changing gears or starting at a low-speed gear stage in an automatic clutch vehicle is improved. In a clutch control arrangement for controlling the engagement and disengagement of a friction-type clutch (1) by means of a clutch actuator (3) and a control unit (14), clutch disengagement speed is reduced when, at least, a gear-changing operation by a driver is detected, and the transmission (20) is in a low-speed gear stage. Even when the clutch is automatically disengaged at gear change, since disengagement speed is reduced if the current gear stage is a low-speed gear stage, the clutch (1) is not abruptly disengaged, enabling the prevention of clutch disengagement shock due to the sudden release of torsional torque. Because high torsional torque is normally transmitted to the drive system when either the clutch is in a partly engaged state or the accelerator stroke is large, it is desirable to reduce disengagement speed in these states.

20 Claims, 3 Drawing Sheets

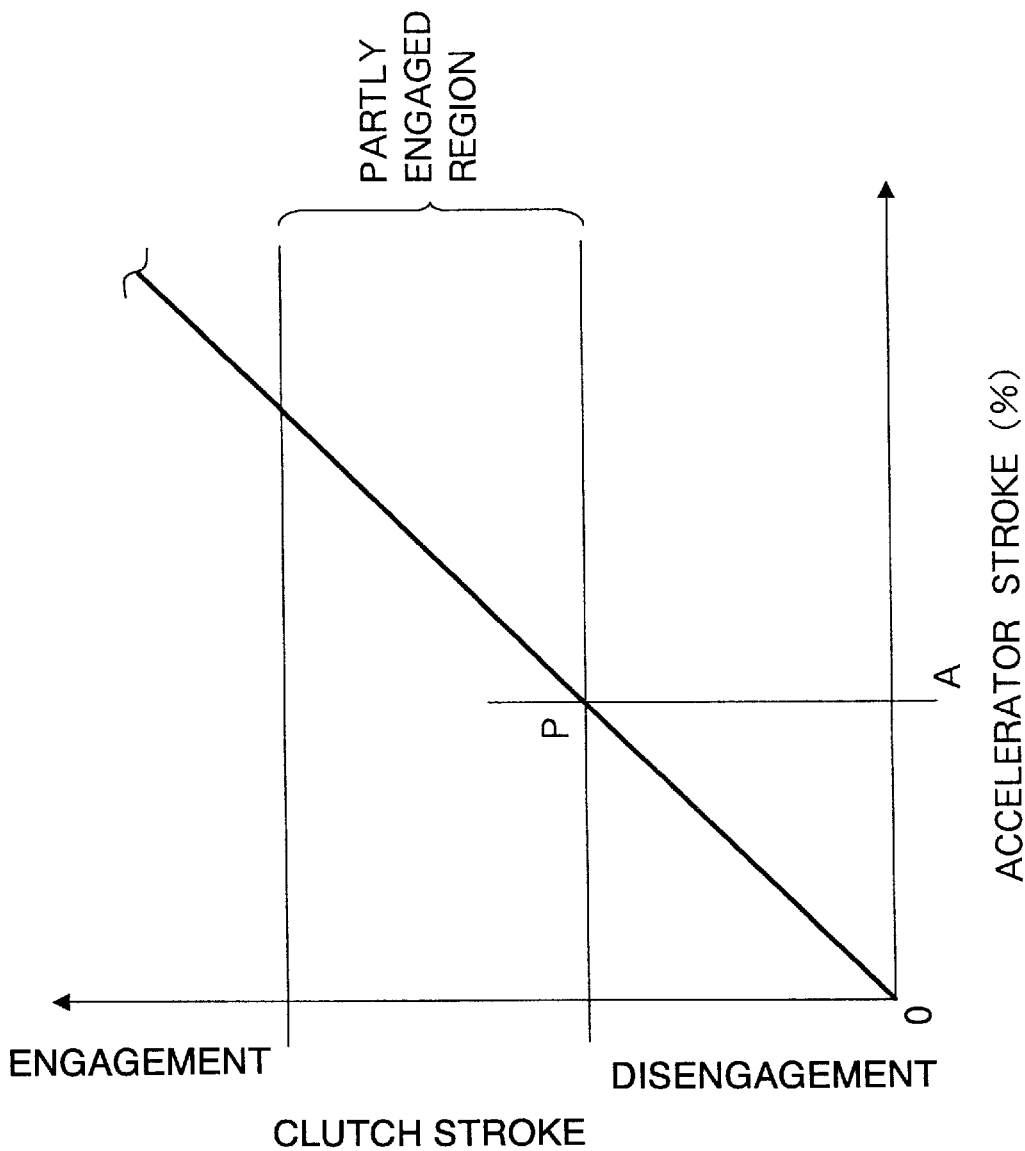

CLUTCH CONTROL APPARATUS

CROSS REFERENCES TO RELATED APPLICATIONS

This application claims priority under 35 USC 119 of Japanese Patent Application No. 2000-203136 filed in JPO on Jun. 30, 2000, the entire disclosure of which is incorporated herein by reference.

BACKGROUND OF THE INVENTION

1. Field of the Invention

The present invention relates in general to an automatic clutch vehicle, and further, to a clutch control apparatus used in a vehicle such as this, and more particularly, to a clutch control apparatus for automatically engaging and disengaging a friction-type clutch.

2. Description of the Related Art

The applicant, in Japanese Patent Application Laid-Open Publication Nos. 11-245679 and 11-247885, filed patent applications related to an automatic clutch vehicle, in which a friction clutch is automatically engaged/disengaged by a clutch actuator on the basis of an engage/disengage command from a control unit.

The problem is that, in this type of automatic clutch vehicle, clutch disengagement shock occurs when either changing gears or accelerating in a low-speed gear stage is performed. That is, in an automatic clutch vehicle, when the switch for changing gears is turned ON by a driver, the intention to change gears is detected, and automatic clutch disengagement is started. However, when a clutch is suddenly disengaged in a state in which the driver is stepping down on the accelerator, the high torsional torque transmitted to the drive system up until that time is instantly released, clutch disengagement shock occurs, and lurching and other vibrations also take place, making for an unpleasant ride for a passenger. And this also gives rise to the problem of the engine suddenly revving up and the like. Further, among automatic clutch vehicles, there are those that control start of travel so that the clutch engages in accordance with the accelerator being actuated. However, when the accelerator is suddenly released in the clutch engagement process, because the clutch is also suddenly disengaged, similar to hereinabove, there occurs the problems of the torsional torque in the drive system being instantly released and clutch disengagement shock and the like.

SUMMARY OF THE INVENTION

An object of the present invention is to reduce clutch disengagement shock brought on by the instant release of torsional torque when changing gears or accelerating in a low-speed gear stage is carried out.

Another object of the present invention is to improve ride-feeling when changing gears or accelerating in a low-speed gear stage is carried out.

According to one aspect of the present invention, there is provided a clutch control apparatus for controlling engagement and disengagement of a clutch via a control unit which comprises a clutch actuator for driving the engagement and disengagement of the clutch, and a control unit for issuing a clutch engage/disengage command to the clutch actuator, this clutch control apparatus further comprising gear-change operation detecting means for detecting a gear-change operation by a driver, gear stage detecting means for detecting the current gear stage of a transmission, and clutch disengagement speed reducing means for setting clutch disengagement speed to low speed when at least the conditions that a gear-change operation by a driver is detected and a transmission is in a low-speed gear stage have been satisfied. In accordance with such constitution, even when a gear-change operation is detected and the clutch is automatically disengaged, if the current gear stage is a low-speed gear stage, disengagement speed is slowed down, and consequently, the clutch is not abruptly disengaged, the sudden release of torsional torque is prevented, and clutch disengagement shock can be reduced.

The apparatus may further include partial engagement detecting means for detecting when the clutch is in a partly engaged state, and the clutch disengagement speed reducing means may reduce clutch disengagement speed when the condition which states that the clutch is in a partly engaged state is added. In the clutch engagement process, high torsional torque is transmitted to the drive system in a partly engaged state, also when the gear is being changed and when the vehicle is starting travel. Accordingly, by reducing disengagement speed when the clutch is disengaged from this state, it is possible to prevent clutch disengagement shock due to the sudden release of torsional torque.

The apparatus may further include accelerator stroke detecting means for detecting the stroke of the accelerator, and the clutch disengagement speed reducing means may reduce clutch disengagement speed when the condition which states that the accelerator stroke exceeds a prescribed value is added. Because high torsional torque is generally transmitted to the drive system when an accelerator stroke is large, by reducing disengagement speed when the clutch is disengaged from this state, it is possible to prevent clutch disengagement shock due to the sudden release of torsional torque.

The apparatus may further include clutch start travel control means for engaging/disengaging the clutch in accordance with the rise/fall of the accelerator stroke when the vehicle starts traveling. In accordance therewith, even if the accelerator is abruptly released in the midst of the accelerator being actuated and the clutch being engaged when the vehicle starts traveling, since the clutch is disengaged at low speed, it is possible to prevent clutch disengagement shock.

In an automatic clutch vehicle incorporating a clutch control apparatus such as this, clutch disengagement shock due to a sudden release of torsional torque at either gear-change or start of travel is eliminated, making it possible to achieve a comfortable ride-feeling. In the present invention, it is possible to realize a so-called selective automatic clutch apparatus, which also enables manual engagement/disengagement.

Additional objects, aspects and advantages of the present invention will become apparent to those skilled in the art to which this invention relates from the subsequent description of the preferred embodiments and the appended claims, taken in conjunction with the accompanying drawing

BRIEF DESCRIPTION OF THE DRAWINGS

FIG. 3 is a map utilized during start-of-travel control in the control apparatus.

DESCRIPTION OF THE PREFERRED EMBODIMENT

A preferred embodiment of the present invention will be described in detail hereinbelow on the basis of the attached figures.

Figure 1:
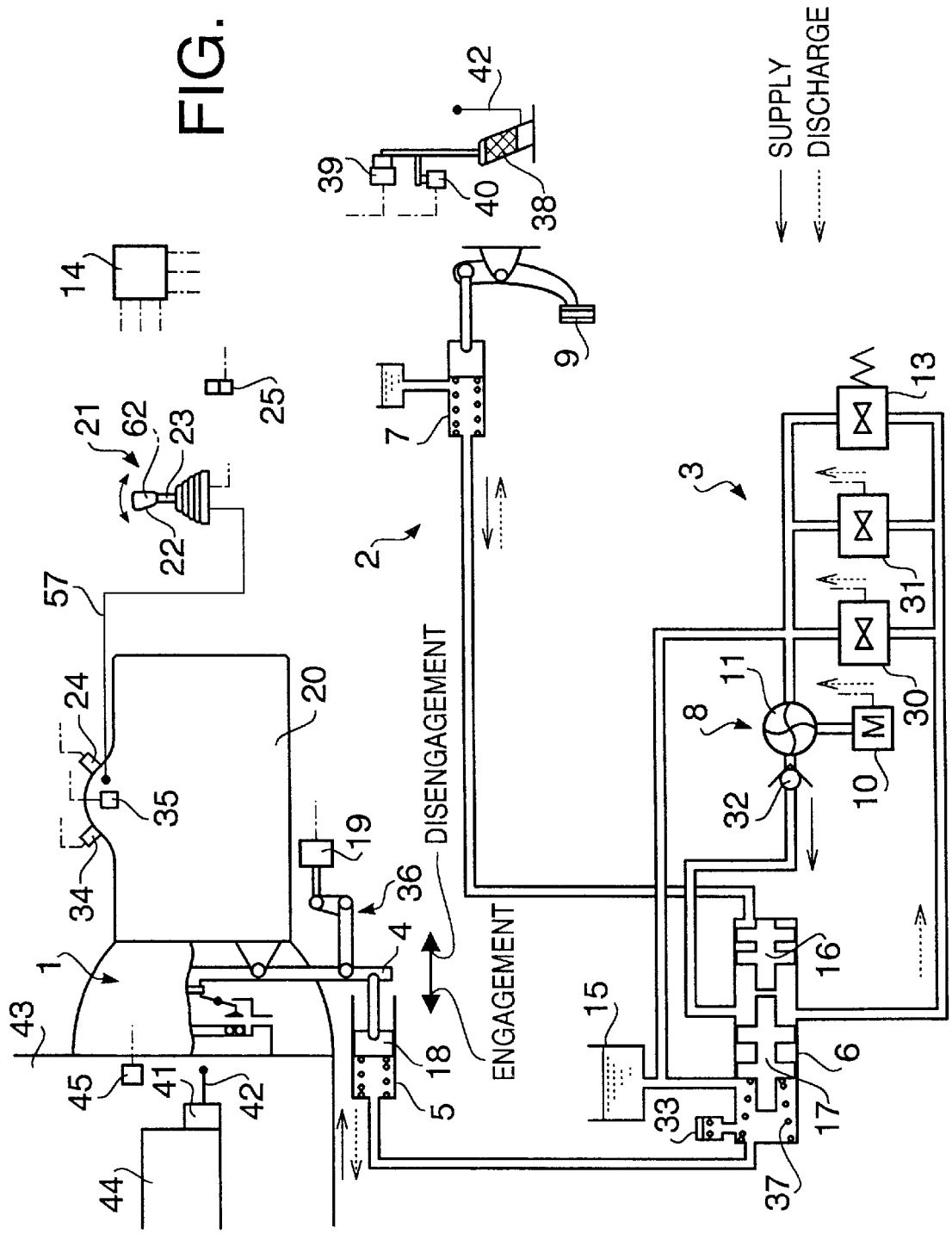
FIG. 1 is a general block diagram of an automatic clutch vehicle according to a preferred embodiment of the present invention.

FIG. 1 shows the constitution of an automatic clutch vehicle related to the embodiment. In this automatic clutch vehicle, there is mounted a so-called selective automatic clutch apparatus. The selective automatic clutch apparatus is constituted such that an ordinary dry-type friction clutch is used in a clutch 1, and this clutch is either manually engaged and disengaged by manual engagement/disengagement means 2, or automatically engaged and disengaged via automatic engagement/disengagement means 3. The figure shows a state, in which the clutch 1 is engaged, and none of the means is being operated.

The clutch 1 is stroked in the engage/disengage direction by causing a clutch fork 4 thereof to move back and forth by a slave cylinder 5 which functions as a fluid pressure cylinder. The oil pressure (fluid pressure) which constitutes the clutch operating force is supplied to the slave cylinder 5 from an intermediate cylinder 6. The intermediate cylinder 6 sends to the slave cylinder 5 oil pressure corresponding to oil pressure supplied from either a master cylinder 7 or an oil pressure source 8. The master cylinder 7 generates oil pressure corresponding to the actuating quantity (operational quantity) of a clutch pedal 9, and sends the oil pressure to the intermediate cylinder 6. The oil pressure source 8 comprises a motor 10, a hydraulic pump 11, a check valve 32, electromagnetic valves 30, 31, and a relief valve 13, and the motor 10 and the electromagnetic valves 30, 31 are driven and controlled by an electronic control unit 14, and prescribed oil pressure supply/discharge control is performed. A hydraulic circuit is constituted therefrom, and the oil which functions as operating fluid is stored in an oil tank 15.

The electromagnetic valves 30, 31 are duty controlled by the control unit 14, and normal close valves, that is, valves that close at OFF, are used here. The electromagnetic valves 30, 31 are used for clutch engagement. The channel diameter of each electromagnetic valve 30, 31 is different. Accordingly, by changing the ON/OFF combinations of these electromagnetic valves 30, 31, three types of clutch engagement speeds (low speed, medium speed, and high speed) can be selected. The relief valve 13 is a fail-safe valve which opens when oil pressure rises abnormally; normally it is closed.

For this constitution, the manual engagement/disengagement of the clutch 1 is carried out as follows. First, when the clutch pedal 9 is actuated in the state shown in the figure, oil pressure is generated by the master cylinder 7. Then, as indicated by the solid line arrow, this oil pressure pushes two pistons 16, 17 inside the intermediate cylinder 6 simultaneously, and in the same direction, and oil pressure equivalent to the pedal actuating quantity is supplied to the slave cylinder 5 from the intermediate cylinder 6. When this happens, a piston 18 inside the slave cylinder 5 is pushed, and in accordance therewith, the clutch fork 4 is pushed, and the clutch 1 is operated to the disengagement side by an amount equivalent to the pedal actuating quantity. When the clutch pedal 9 release operation is performed, the oil is returned as indicated by the broken line arrow, and the clutch 1 is operated to the engagement side. At this time, the pistons 16, 17 of the intermediate cylinder 6 are pushed and returned to their normal positions by a return spring 37. By so doing, manual engagement/disengagement is achieved, and the clutch pedal 9, the master cylinder 7, the intermediate cylinder 6, and the slave cylinder 5 come to constitute the manual engagement/disengagement means 2.

Furthermore, the automatic engagement/disengagement method of the clutch 1 will be described below.

The stroke of the clutch 1 or the clutch fork 4 is constantly detected by a clutch stroke sensor 19. The clutch stroke sensor 19 is a potentiometer which is operated by the clutch fork 4 via a linkage 36. The clutch stroke sensor 19 is constituted so as to output a voltage that becomes larger as the clutch stroke is closer to the disengagement side. Further, a hydraulic switch 33 is disposed at the outlet portion of the intermediate cylinder 6. This hydraulic switch turns ON when the outlet pressure of the intermediate cylinder 6 rises to a certain set value. Signals from this sensor 19 and the switch 33 are sent to the control unit 14.

An ordinary transmission (manual transmission) 20 is mounted in this vehicle. The transmission 20 is mechanically connected to a shift lever 23 via mechanical connecting means 57, such as a linkage and wire cable and the like, and a gear-change operation is performed in response to a shift lever operation by a driver.

The shift lever 23 is one part of a shift lever apparatus 21. That is, the shift lever apparatus 21 comprises the shift lever 23, a shift knob 22, which forms the gripping part thereof, and a knob switch 62, which is built into the shift knob 22. The shift knob 22 is capable of rocking (oscillating) slightly in the shift direction relative to the shift lever 23, and normally is held in the center position by a built-in spring, but the shift knob 22 is constituted so as to rock and turn ON the knob switch 62 when a prescribed shifting force is applied.

In the transmission 20, there are disposed a shift stroke sensor 34 for detecting an internal shifter lever stroke in the shift direction, a neutral switch 24 for detecting when the shifter lever is in the neutral position, and a select stroke sensor 35 for detecting a shifter lever stroke in the select direction. Based on signals of these sensors and switch, the control unit 14 detects the current gear stage of the transmission 20.

The automatic engagement/disengagement method of the clutch 1 will be described here. It is supposed that a driver has applied shift force to the shift knob 22 in an attempt to change gears while travelling in a prescribed gear stage. When this happens, the shift knob 22 rocks slightly, the knob switch 62 turns ON, and, taking this as a cue, the control unit 14 sends a clutch disengage command to automatic engagement/disengagement means 3, and, more specifically, starts up the motor 10. When this happens, the hydraulic pump 11 is started up, oil pressure is generated, and, as indicated by the solid line arrow, this oil pressure pushes open the check valve 32 and goes to the intermediate cylinder 6. In the intermediate cylinder 6, the pistons 16, 17 are moved in opposite directions. In accordance therewith, the piston 17 of the outlet side applies further pressure to the oil of the outlet side, sending the oil pressure to the slave cylinder 5. When this happens, the piston 18 of the slave cylinder 5 pushes the clutch fork 4 and disengages the clutch 1. Disengagement speed can be controlled by controlling the supply power to the motor 10 by the control unit 14.

When the control unit 14 recognizes, via a signal from the clutch stroke sensor 19, that the clutch is completely disengaged, the control unit 14 stops the motor 10. At this time, the oil pressure is maintained by the check valve 32, and the clutch 1 is held in disengagement. In the meantime, the follow-up shift lever operation can be performed by the driver, setting the transmission 20 to the next gear stage.

When the control unit 14 recognizes, from signals from the shift stroke sensor 34 and the select stroke sensor 35, that the transmission is in gear, the control unit 14 simultaneously sends a clutch engagement command to the automatic engagement/disengagement means 3, and commences engagement control of the clutch 1. Specifically, the control unit 14 turns ON at the least one of the electromagnetic valves 30, 31, discharges the oil pressure from the slave cylinder 5 as indicated by the broken line arrow, releases the clutch fork 4, and engages the clutch 1. At this time, the engagement state of the clutch and the degree of accelerator actuation, and, in turn, the engine and vehicle driving states are included, the optimum ON/OFF combination of the electromagnetic valves 30, 31 is selected, and duty control for the electromagnetic valves is performed. In accordance therewith, the clutch is engaged at the optimum speed.

Thus, the oil pressure source 8, the intermediate cylinder 6, and the slave cylinder 5 form the automatic engagement/disengagement means 3, and this automatic engagement/disengagement means 3 is optimally controlled by the control unit 14. The automatic engagement/disengagement means 3 forms what is called a clutch actuator in the present invention.

Furthermore, switching between manual engagement/disengagement and automatic engagement/disengagement is carried out via a changeover switch 25 disposed on the vehicle interior.

Here, clutch automatic engagement/disengagement control is performed as described hereinabove at the time of a vehicle starting traveling as well. That is, it is supposed that a driver has operated the shift lever 23 from neutral to the start-of-travel stage in an attempt to start the vehicle. By so doing, the shift knob 22 rocks in advance of the shift lever 23 operation, and the knob switch 62 turns ON. Taking this as a cue, the clutch 1 is automatically disengaged, and the transmission 20 is placed in the start-of-travel stage by the follow-up shift lever operation. Thereafter, clutch disengagement is maintained, and it becomes an accelerator actuation waiting state, and when an accelerator 38 is actuated by the driver, the engine revs up in accordance with the actuation quantity thereof, and, the clutch 1 is automatically engaged together therewith.

An accelerator stroke sensor for detecting the actuating quantity, that is, the accelerator stroke, of the accelerator 38 is provided for such start-of-travel control. An accelerator stroke sensor 39 is a potentiometer, and outputs a voltage signal which is proportionate to the accelerator stroke. Further, an accelerator idling switch 40 is disposed in the vicinity of the accelerator, and this accelerator idling switch 40 is ON when the accelerator 38 is in the idling region, and is OFF when the accelerator 38 is being actuated beyond the idling region. The outputs of this sensor 39 and the switch 40 are sent to the control unit 14.

The accelerator 38 is mechanically connected to an engine output control mechanism 41 via mechanical connecting means 42, such as a wire and a linkage. Here, an engine 43 is a diesel engine, and the engine output control mechanism 41 is a mechanical governor disposed in a fuel injection pump 44. However, it is possible to make the engine a gasoline engine, in which case, the engine output control mechanism would become a throttle valve. In the engine 43, there is provided an engine speed sensor 45 for detecting engine speed (more specifically, crankshaft speed), and the output thereof is sent to the control unit 14.

Control for start of travel, for example, is performed in accordance with a map showing the relationship between an accelerator stroke and a clutch stroke, as shown in FIG. 3, and is such that the clutch 1 is gradually engaged in line with an increase of the accelerator stroke.

Now then, in this automatic clutch vehicle, the following clutch control is executed to reduce clutch disengagement shock when changing gears or starting travel in a low-speed gear stage.

Figure 2:
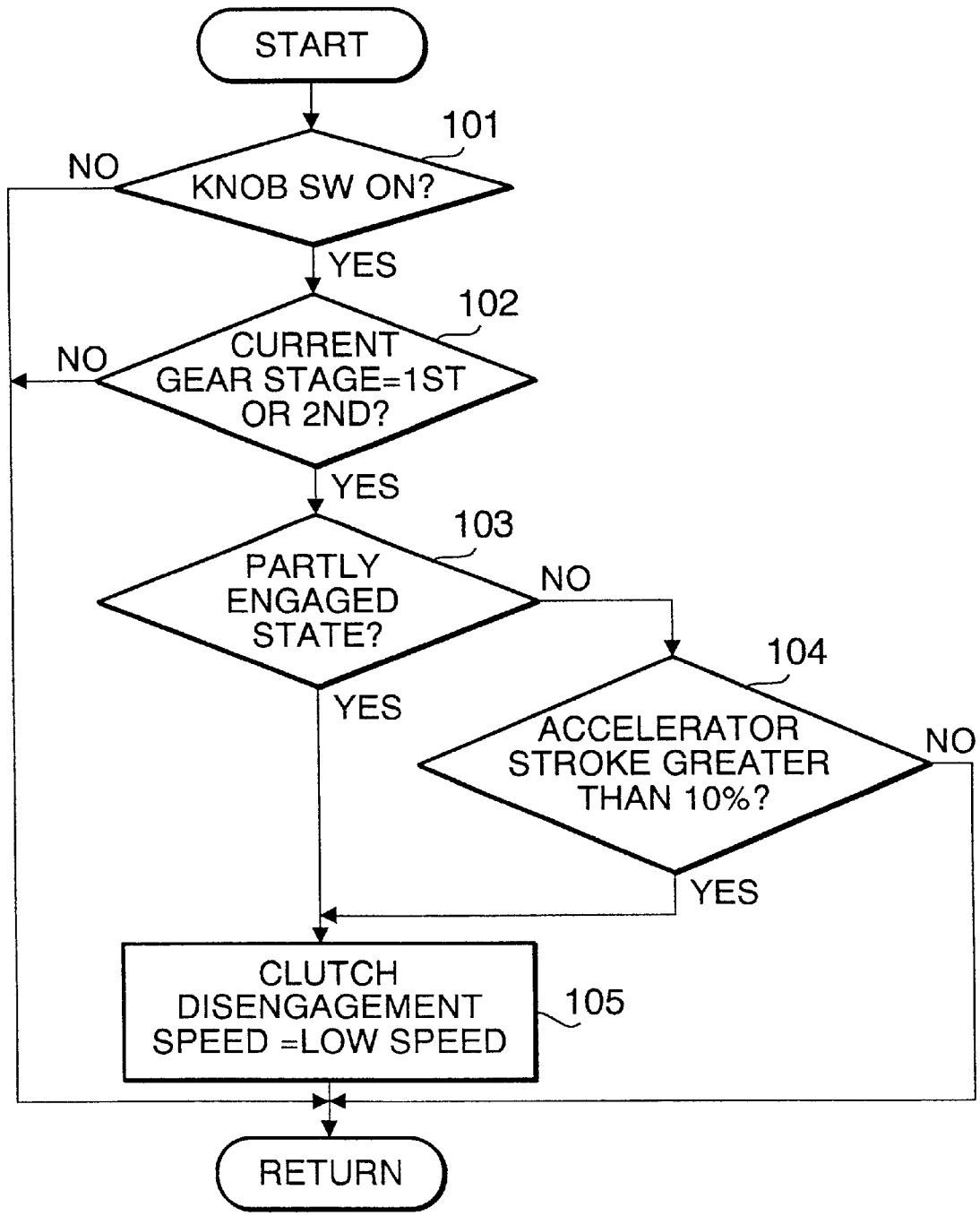
FIG. 2 is a control flowchart of a clutch control apparatus used in the vehicle shown in FIG. 1.

FIG. 2 shows the flow of control. The control unit 14 first makes a determination in Step 101 as to whether or not the knob switch 62 is ON. In other words, this control commences at the same time as knob switch ON. If NO, processing returns to START, and if YES, processing proceeds to Step 102. In Step 102, a determination as to whether or not the current gear stage is a low-speed stage, here, either 1st gear or 2nd gear is made from the signals of the shift stroke sensor 34 and the select stroke sensor 35. If NO, then processing returns to START, and if YES, processing proceeds to Step 103.

In Step 103, a determination is made as to whether or not the clutch is currently in a partly engaged state. That is, because the control unit 14 stores a clutch stroke value equivalent to the partly engaged region in internal memory as a learned value, the determination of this step is performed by comparing this learned value against an actual clutch stroke value detected by the clutch stroke sensor 19. If NO, processing proceeds to Step 104, and if YES, processing jumps to Step 105.

In Step 104, on the basis of a signal from the accelerator stroke sensor 39, a determination is made as to whether or not the accelerator stroke exceeds a predetermined value (here, 10%). If NO, processing returns to START, and if YES, processing proceeds to Step 105.

In Step 105, clutch disengagement speed is set to low speed. That is, since the torque transmitted to the drive system is assumed to be great at this time, clutch disengagement speed is slowed down, and the sudden release of transmitted torque simultaneous to clutch disengagement is prevented. Thus, since clutch disengagement is performed slowly, the release of the torque transmitted to the drive system is also performed gradually, and clutch disengagement shock is reduced.

The control will be applied to an actual vehicle operating state. Firstly, shifting up from a low-speed gear stage (either 1st gear or 2nd gear) will be described. This control is started at the same time that the knob switch 62 turns ON when a driver attempts to upshift while travelling in a low-speed gear stage, and the conditions of Steps 101 and 102 are satisfied. Next, the condition of Step 103 is met when the clutch stroke reaches the partly engaged region in the clutch disengagement process, and clutch disengagement speed is slowed down in Step 105. Because the ideal is to shorten the overall disengagement time, from complete engagement to complete disengagement, as much as possible at this time, during the interval from the clutch complete engagement position to the starting point of the partly engaged region, and the interval from the end point of the partly engaged region to the clutch complete disengagement position, engagement speed is made high speed, and is not subjected to the constraints of this control. In other words, disengagement speed is forcibly switched to low speed only during the interval of the partly engaged region when clutch disengagement shock occurs. Thus, the reduction of clutch disengagement shock is provided for without uselessly lengthening overall disengagement time.

Furthermore, there is a mechanical linkage between the shift lever and the transmission, and since drawing a gear cannot actually be performed without the clutch being sufficiently disengaged (more specifically, from the vicinity of the end point of the partly engaged region), by slowing down disengagement speed, the taking-out-of-gear-feeling degenerates slightly. However, even so, the advantage of being able to further reduce disengagement shock is greater.

When upshifting like this, the accelerator is usually released at the same time as the operation of drawing a gear (clutch disengagement) by the driver, but, if clutch disengagement is performed rapidly, and the accelerator release operation is slower than the disengagement of the clutch, high torque is released all of a sudden, and clutch disengagement shock occurs. In addition, the problem of the engine suddenly revving up also arises at this time. This control reliably eliminates these problems, and substantially improves ride-feeling. Furthermore, when the accelerator return quantity is not complete, and the accelerator stroke remains greater than the predetermined value (10%) (Step 104=YES), clutch disengagement speed is reduced even when the clutch is not partly engaged (Step 103=NO).

Next, operation for starting travel will be described. Usually, the start-of-travel stage is the same as the low-speed gear stage (1st gear or 2nd gear). When a driver attempts to put the shift lever in a low-speed gear stage in an effort to start travel while the vehicle is stopped and in a transmission-neutral state, the knob switch is turned ON, the condition for Step 101 is satisfied, and this control commences. Thereafter, the condition for Step 102 is satisfied when a gear is shifted into a low-speed gear stage, and when the accelerator is actuated, the clutch is engaged in accordance with the actuating quantity thereof, and engine torque is gradually transmitted to the drive system.

However, there are times when the accelerator is abruptly released during this engagement process due to being held up by the vehicle in front or some other reason. Generally, the clutch is quickly disengaged in response to the release operation thereof, but with this control, disengagement speed is forcibly slowed down, enabling the reduction of clutch disengagement shock.

That is, if the clutch already meets the condition of a partly engaged state (Step 103=YES), or the accelerator stroke is greater than a predetermined value (10%) (Step 104=YES), clutch disengagement speed becomes low speed. Thus, even when an abrupt accelerator release operation is preformed in the middle of start-of-travel operation, clutch disengagement shock can be reduced.

In this sense, the predetermined value of the accelerator stroke must be set at the minimum stroke required for starting travel, for example, at less than the accelerator stroke A constituting the clutch engagement starting point P (partly engaged region starting point in the engagement direction) shown in FIG. 3.

As is clear from the above description, in this embodiment, the control unit 14 forms what is called "clutch disengagement speed reducing means" and "clutch start-of-travel control means" in the present invention. Similarly, the control unit 14 and the clutch stroke sensor 19 form "partial engagement detecting means," the control unit 14, the shift stroke sensor 34, the neutral switch 24 and the select stroke sensor 35 form "gear stage detecting means," and the control unit 14 and the accelerator stroke sensor 39 form "accelerator stroke detecting means."

Furthermore, the present invention is not limited to the described and illustrated embodiment. For example, in the control, theoretically, clutch disengagement shock can be prevented even if Steps 103 and 104 are omitted. But, practically speaking, omitting Step 103 is not desirable as disengagement speed would be slowed down in all clutch regions, lengthening the overall disengagement speed. And if Step 104 is omitted, no consideration whatsoever would be given to an accelerator stroke, raising the fear of trouble occurring, especially at starting traveling. In this sense, it is desirable to have Steps 103 and 104. However, an alternative embodiment in which only one of these steps 103 and 104 is provided is also possible.

Further, as for the clutch, a wet multiple disc clutch is possible, and such a clutch is also included in what is called a "friction clutch" in the present invention. What is called "gear change operation detecting means" in the present invention was the knob switch 62 in this embodiment, but another switch, for example, a switch provided in the mechanical connecting means 57, or a switch provided on the steering wheel or the like, is also possible.

In short, according to the above present invention, an outstanding advantage is manifested, whereby clutch disengagement shock, resulting from the sudden release of drive system torsional torque at the time of changing gears or starting a vehicle in a low-speed gear stage, can be reduced, enabling improved ride-feeling.

What is claimed is:

1. A clutch control apparatus for controlling engagement and disengagement of a friction-type clutch comprising:
   a clutch actuator for driving engagement and disengagement of a clutch; and
   a control unit for issuing a clutch engage/disengage command to the clutch actuator, the improvement further comprising:
   gear-change operation detecting means for detecting a gear-change operation by a driver;
   gear stage detecting means for detecting the current gear stage of a transmission; and
   clutch disengagement speed reducing means for setting clutch disengagement speed to low speed when at least the conditions that a gear-change operation by a driver has been detected and the transmission is in a low-speed gear stage are satisfied.

2. The clutch control apparatus according to claim 1, wherein said clutch actuator includes:
   a motor which is turned ON for clutch disengagement, and turned OFF for clutch engagement by said control unit and supply power to which is controlled by said control unit during the state in which the motor is turned ON;
   a hydraulic pump which is driven by the motor;
   cylinders which are operated in accordance with an output pressure of the hydraulic pump; and
   electromagnetic valves which are turned ON for clutch engagement and turned OFF for clutch disengagement by said control unit and which cause the discharge of oil from said cylinders during the state in which the electromagnetic valves are turned ON.

3. The clutch control apparatus according to claim 2, wherein the clutch control apparatus is provided with two said electromagnetic valves, the electromagnetic valves have different channel diameters from each other, and at least three types of clutch engagement speeds of high speed, medium speed, low speed can be selected by combining the ON and OFF of the electromagnetic valves.

4. The clutch control apparatus according to claim 1, wherein said gear-change operation detecting means includes a knob switch for detecting the rocking of a shift knob which is mounted in a rockable condition to a shift lever.

5. The clutch control apparatus according to claim 1, wherein said gear stage detecting means includes a shift stroke sensor and a select stroke sensor which are disposed on said transmission.

6. The clutch control apparatus according to claim 1 further including partial engagement detecting means for detecting that said clutch is in a partly engaged state, wherein said clutch disengagement speed reducing means sets clutch disengagement speed to low speed, when the condition that said clutch is in a partly engaged state has been added.

7. The clutch control apparatus according to claim 1 further including accelerator stroke detecting means for detecting an accelerator stroke, wherein said clutch disengagement speed reducing means sets clutch disengagement speed to low speed, when the condition that an accelerator stroke is greater than a predetermined value has been added.

8. The clutch control apparatus according to claim 7, wherein the predetermined value of said accelerator stroke is 10%.

9. The clutch control apparatus according to claim 7 further including clutch start-of-travel control means for engaging/disengaging said clutch in accordance with the rise/fall of said accelerator stroke when a vehicle starts movement.

10. The clutch control apparatus according to claim 2 further including manual engagement/disengagement means for manually engaging/disengaging said clutch.

11. The clutch control apparatus according to claim 10, wherein, said cylinders, in order to execute automatic engagement/disengagement and manual engagement/disengagement of said clutch without interference, is constituted by a first cylinder which is positioned on an upstream side of an oil pressure supply direction and which has two pistons, one on an inlet side and the other on an outlet side, and constituted by a second cylinder which is positioned on a downstream side of the oil pressure supply direction and which engages/disengages said clutch in accordance with an output pressure of said first cylinder;

said manual engagement/disengagement means is constituted by a clutch pedal, a master cylinder for supplying and discharging oil pressure in accordance with the actuation/release of said clutch pedal, said first cylinder, and said second cylinder;

an output side of said hydraulic pump is connected via a check valve to a location between the two pistons of said first cylinder, and said master cylinder is connected to a location on a further inlet side than the inlet-side piston of said first cylinder;

for automatic disengagement of the clutch, an output oil of said hydraulic pump pushes open the check valve and moves the two pistons of said first cylinder in opposite directions, and oil pressure is supplied to said second cylinder by the pushing movement of said outlet-side piston, causing the second cylinder to operate in the disengagement direction; and for manual disengagement of the clutch, the output oil of said master cylinder simultaneously pushes the two pistons of said first cylinder to the outlet side, and oil pressure is thereby sent to said second cylinder, causing said second cylinder to operate in the disengagement direction.

12. An automatic clutch vehicle which controls engagement/disengagement of a friction clutch based on a control signal outputted from an electronic control unit, comprising:

a motor which is turned ON for clutch disengagement, and turned OFF for clutch engagement by said electronic control unit, and supply power to which is controlled by said electronic control unit during the state in which the motor is turned ON;

a hydraulic pump which is driven by the motor;

a first cylinder which is connected via a check valve to the hydraulic pump and which has pistons on the inlet side and the outlet side respectively;

a second cylinder which is connected to the first cylinder and which engages/disengages said clutch;

electromagnetic valves which are turned ON for clutch engagement and turned OFF for clutch disengagement by said electronic control unit and which discharge oil from said first cylinder during the state in which the electromagnetic valves is turned ON;

a clutch pedal; and a master cylinder for supplying and discharging oil pressure of the first cylinder in accordance wit the actuation/release of the clutch pedal, wherein, for automatic disengagement of the clutch, an output oil of said hydraulic pump pushes open the check valve and moves the two pistons of said first cylinder in opposite directions, and oil pressure is supplied to said second cylinder by the pushing movement of said outlet-side piston, causing the clutch to be disengaged by the second cylinder; and for manual disengagement of the clutch, an output oil of said master cylinder simultaneously pushes the two pistons of said first cylinder to the outlet side, and oil pressure is thereby sent to said second cylinder, causing the clutch to be disengaged by said second cylinder, wherein said automatic clutch vehicle further comprises:

a gear-change operation detecting switch that is operated by a driver for detecting a gear-change operation by a driver;

a gear stage detecting sensor disposed in a transmission for detecting the current gear stage of the transmission;

a clutch stroke sensor for detecting the stroke of said clutch for determining whether or not aid clutch is in a partly engaged state; and an accelerator stroke sensor for detecting an accelerator stroke, and wherein said electronic control unit, based on the outputs of the switch and sensors, slows down clutch disengagement speed either when a gear-change operation is detected and it is determined that the transmission is in a low-speed gear stage and that the clutch is in a partly engaged state, or when a gear-change operation is detected and it is determined that the transmission is in a low-speed gear stage and that the clutch is not in a partly engaged state and that an accelerator stroke is greater than a predetermined value.

13. The automatic clutch vehicle according to claim 12 further including start-of-travel control means for engaging/disengaging the clutch in accordance with the rise/fall of an accelerator stroke when the vehicle starts traveling, wherein clutch disengagement is performed at low speed if an accelerator stroke is abruptly reduced during clutch engagement, when said electronic control unit detects a gear-change operation and determines that the transmission is in a low-speed gear stage and that the clutch is not in a partly engaged state and that the accelerator stroke is greater than a predetermined value.

14. A clutch control method for controlling engagement/disengagement of a friction-type clutch via a clutch actuator and a control unit comprising the steps of:

(A) detecting a gear-change operation by a driver;

(B) detecting the current gear stage of a transmission; and (C) reducing clutch disengagement speed to low speed when at least the conditions that a gear-change operation by a driver has been detected and that the transmission is in a low-speed gear stage have been satisfied, wherein the step (A) and the step (B) may be performed simultaneously.

15. The clutch control method according to claim 14, wherein said clutch actuator includes:

a motor which is turned ON for clutch disengagement and turned OFF for clutch engagement by said control unit and supply power to which is controlled by said electronic control unit during the state in which the motor is turned ON;

a hydraulic pump which is driven by the motor;

cylinders which are operated in accordance with an output pressure of the hydraulic pump; and electromagnetic valves which are turned ON for clutch engagement and turned OFF for clutch disengagement by said control unit and which discharge oil from said cylinders during the state in which the electromagnetic valves are turned ON.

16. The clutch control method according to claim 14, wherein in the step (A) a knob switch for detecting the rocking of a shift knob which is mounted in a rockable condition to a shift lever is used.

17. A clutch control method for controlling engagement/disengagement of a friction-type clutch via a clutch actuator and a control unit comprising the steps of:

(A) detecting a gear-change operation by a driver;

(B) detecting the current gear stage of a transmission;

(C) reducing clutch disengagement speed when at least the conditions that a gear-change operation by a driver has been detected and that the transmission is in a low-speed gear stage have been satisfied, wherein the step (A) and the step (B) may be performed simultaneously; and (D) detecting that said clutch is in a partly engaged state, wherein the step (C) reduces clutch disengagement speed when the condition that the clutch is in a partly engaged state has been added.

18. A clutch control method for controlling engagement/disengagement of a friction-type clutch via a clutch actuator and a control unit comprising the steps of:

(A) detecting a gear-change operation by a driver;

(B) detecting the current gear stage of a transmission;

(C) reducing clutch disengagement speed when at least the conditions that a gear-change operation by a driver has been detected and that the transmission is in a low-speed gear stage have beep satisfied, wherein the step (A) and the step (B) may be performed simultaneously; and (E) detecting an accelerator stroke, wherein the step (C) reduces clutch disengagement speed when the condition that an accelerator stroke is greater than a predetermined value has been added.

19. The clutch control method according to claim 18 further including the step (F) of engaging/disengaging the clutch in accordance with the rise/fall of an accelerator stroke when the vehicle starts traveling, wherein clutch disengagement is performed at low speed when said accelerator stroke is abruptly reduced during clutch engagement.

20. The clutch control method according to claim 18, wherein the predetermined value of said accelerator stroke is set at less than the minimum stroke (A) required for the vehicle to start traveling.

* * * * *